3,632,787
VINYL ACETATE CONTAINING AQUEOUS EMUL-
SIONS AND PROCESS FOR PRODUCING SAME
Arnold Gesner Wilbur, Summit, N.J., assignor to Celanese
Corporation, New York, N.Y.
No Drawing. Filed Jan. 3, 1969, Ser. No. 788,917
Int. Cl. C08f 29/42
U.S. Cl. 260—29.6 RW    8 Claims

ABSTRACT OF THE DISCLOSURE

An improved stable polyvinyl acetate containing aqueous emulsion wherein a vinyl acetate copolymer base is overpolymerized by at least one ethylenically unsaturated monomer other than vinyl acetate in sufficient quantities to substantially prevent the vinyl acetate consituent from hydrolyzing.

---

This invention relates to improved stable vinyl acetate-containing aqueous emulsions and processes to produce same. More particularly, the invention is directed to improved stable vinyl acetate-containing aqueous emulsions wherein a vinyl acetate copolymer base is overpolymerized by at least one ethylenically unsaturated monomer other than vinyl acetate in sufficient quantities to prevent the vinyl acetate constituent from hydrolyzing. Additionally, the invention is directed to a unique polymerization technique to produce these novel compositions having solids contents in the range from about 50 to about 75 percent which have workable viscosities.

Aqueous emulsions containing various homopolymers and copolymers, e.g., homopolymers and copolymers of vinyl acetate, homopolymers and copolymers of lower alkyl acrylates and methacrylates, such as ethyl acrylate and methyl methacrylate, and the like, have been known for many years. The procedures used to prepare such polymer emulsions generally involve adding, under rapid stirring, one or more ethylenically unsaturated monomers to water which contains or to which there is added, either simultaneously or subsequently, surfactants or emulsifying agents, a polymerization catalyst or initiator and, in many cases, a protective colloid-forming substance. This mixture is then heated to polymerization temperature, with continued stirring, and held at that temperature for the time necessary to substantially completely polymerize the monomer or monomers and form the polymer emulsion. The resulting emulsion, upon cooling and filtering, can be used in many domestic and industrial applications, such as in paints or other coating compositions, e.g., paper coatings and textile-treating compositions, in adhesives or binders, in caulking compositions, and the like, depending on the particular polymers involved and the properties of the emulsions containing them.

An economically attractive emulsion composition for general use is a vinyl acetate copolymer which generally provides a satisfactory base for paints and other uses. The difficulty which arises with the vinyl acetate copolymer compositions is the unstable tendency on standing prior to its use. For example, compared to an all acrylic emulsion, it is well known that vinyl acetate copolymer emulsions tend to increase in viscosity on standing over extended periods of time, and in some instances causes coloration of the coating product due to some chemical reaction of the copolymer thought to be the hydrolysis of the vinyl acetate constituent.

A composition and technique for producing the compositions have been discovered which not only provide vinyl acetate containing aqueous emulsions having improved stability properties but also these emulsions can be made with solids contents as high as 75 percent. The compositions of this invention can be made by copolymerizing vinyl acetate with at least one other ethylenically unsaturated monomer in the presence of a free radical polymerization catalyst to form a base and subsequently polymerize over the base at least one ethylenically unsaturated monomer other than vinyl acetate in sufficient quantities to prevent the acetate constituent from hydrolyzing. These compositions can be prepared by the standard polymerization techniques or in a preferred technique to produce emulsion solids content in excess of 50 and to as high as 75 percent by utilizing the following process steps:

(1) An aqueous pre-emulsion is prepared by adding or utilizing vinyl acetate and at least one or more polymerizable monomers containing at least one ethylenically unsaturated group in the presence of sufficient amounts of at least one surfactant to provide a stable pre-emulsion and subsequently stable latex polymer. The amount of water in the pre-emulsion ranges from about 6 percent to about 25 percent by weight, based on the total monomer present in the pre-emulsion. The monomers which are used must be capable of not only polymerizing but must be capable of forming a stable emulsion in the water present.

(2) The monomer pre-emulsion is then added incrementally or continuously to a reaction medium comprising a portion of the water not required for forming the pre-emulsion but necessary to obtain the solids content desired in the finished product and a portion of a free radical polymerization catalyst in amounts sufficient to initiate the polymerization of at least one or more of the polymerizable monomer in the pre-emulsion. The reaction medium is maintained at temperatures to initiate and continue the polymerization reaction. The rate of addition of the pre-emulsion is controlled to provide substantially complete conversion (as close to 100% as possible) of the monomer as added to the latex polymer. The polymerization of the monomers is conducted in the presence of a free radical polymerization catalyst which is present or added in sufficient amounts to provide substantially complete monomer conversion (as close to 100% as possible) as the latex is formed. After all of the vinyl acetate has copolymerized with at least one ethylenically unsaturated monomer, an ethylenically unsaturated monomer other than vinyl acetate is polymerized over the vinyl acetate copolymer base in sufficient quantities to prevent the vinyl acetate constituent from hydrolyzing. The resulting latex can have total solids in the range from about 50 to about 75 percent, preferably in the range from about 60 to about 75 percent or higher. These high solid latex polymers have workable viscosities and are more stable than other known vinyl acetate copolymers produced heretofore.

Another technique for making the compositions of this invention involves utilizing the standard batch polymerization method to produce the vinyl acetate copolymer base and using another ethylenically unsaturated monomer or the same monomer other than vinyl acetate used to produce the vinyl acetate copolymer, to overpolymerize the vinyl acetate copolymer in sufficient quantities to prevent the vinyl acetate constituent from hydrolyzing. The monomers used to overpolymerize the vinyl acetate copolymer in all processing techniques can be added directly to polymerization reaction or in the form of a pre-emulsion.

The term "overpolymerization" as used in this specification and appended claims is meant to define the technique of subsequent polymerization of a monomer in the presence of the vinyl acetate copolymer base. It is believed that the monomer is subsequently polymerized over the vinyl acetate copolymer but this has not been definitely established. It is known, however, that by virtue of this overpolymerization technique more stable vinyl acetate copolymers are produced. The amount of monomer used in the overpolymerization step can range from about 0.5 to about 25 weight percent based on the total monomer, preferably from 2.0 to about 15 weight percent based on the total monomer. The important criteria concerning the amount of monomer overpolymerized relate to the control of the viscosity of the latex polymer produced i.e. maintain workable viscosities or acceptable viscosities.

The term "workable viscosities" or "acceptable viscosities" as used herein defines that range of viscosity of the latex polymer having the high solids wherein the formulator or user of this latex copolymer can effectively work i.e. blending, pumping, pouring, etc. These ranges include viscosities slightly higher than water to as high as 20,000 centipoises. In some instances the preferred viscosity ranges from 50 to 5000 centipoises. The term "stable latex polymer" as used herein defines the emulsion polymer product which maintains its emulsion properties a minimum of 1 day preferably as long as 6 months or longer.

The emulsions prepared by the novel method of the present invention will contain vinyl acetate or copolymers derived from polymerizable ethylenically unsaturated monomers, preferably ones containing a single $H_2C=C<$ group. The amount of vinyl acetate in the copolymer can range about 2 to about 98 weight percent of the total monomer, preferably from 5 to about 50 weight percent. Many monomers can be included as the ethylenically unsaturated monomer, however, the preferred monomers are those having the structures:

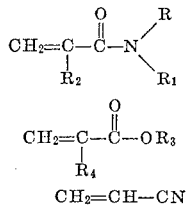

or combination thereof wherein R and $R_1$ each represents a member selected from the group consisting of a hydrogen atom, a methylol group and an alkyl radical containing from 1 to 6 carbon atoms, $R_2$ represents a member selected from the group consisting of a hydrogen atom and a methyl group, $R_3$ represents a member from the group consisting of an alkyl group containing from 1 to 8 carbon atoms, and $R_4$ represents a member from the group consisting of a hydrogen atom and a methyl group.

In general, at least one major monomer component of these polymers will usually be an alkyl acrylate or methacrylate, and particularly the former. Ordinarily, the alkyl acrylate or methacrylate will be one wherein the alkyl group contains less than 10 carbon atoms, such as methyl acrylate, ethyl acrylate, propyl acrylate, n-butyl acrylate, isobutyl acrylate, 2-ethylhexyl acrylate, methyl methacrylate, ethyl methacrylate, isobutyl methacrylate and 2-ethylhexyl methacrylate.

Included among these different comonomers, are higher alkyl esters of acrylic and methacrylic acid, i.e., those having from 10 to 22 or more carbon atoms in the ester moiety, such as decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl lauryl methacrylate.

Derivatives of the hypothetical vinyl alcohol, e.g., aliphatic vinyl esters such as vinyl formate, vinyl propionate, vinyl butyrate, vinyl isobutyrate, vinyl valerate, vinyl caproate and the vinyl ester of versatic acid can be employed in amounts ranging up to about 90% or more by weight, based on the total weight of monomers used, as can allyl esters of saturated (which includes polymerizably non-reactive unsaturation) monocarboxylic acids, e.g., allyl acetate, allyl propionate and allyl lactate, with the latter esters generally being used in relatively small amounts together with larger amounts of one or more different vinyl monomers, and especially aliphatic vinyl esters such as vinyl acetate.

Aliphatic vinyl ethers such as methyl vinyl ether, ethyl vinyl ether and n-butyl vinyl ether can also be employed, as can vinyl ketones, such as methyl vinyl ketone, ethyl vinyl ketone and isobutyl vinyl ketone, and dialkyl esters of monoethylenically unsaturated dicarboxylic acids, e.g., diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

Polymerizable, ethylenically unsaturated monocarboxylic and polycarboxylic acids as well as the available anhydrides, nitriles, unsubstituted amides and substituted (including N-substituted) amides of said acids, can also be employed as comonomers.

More particularly, monoethylenically unsaturated monocarboxylic acids such as acrylic acid, methacrylic acid, ethacrylic acid and crotonic acid, monoethylenically unsaturated dicarboxylic acids such as maleic acid, fumaric acid, itaconic acid and citraconic acid, and monoethylenically unsaturated tricarboxylic acids such as aconitic acid acid can be employed, as can their halogen-substituted (e.g., fluoro- chloro- and bromo-substituted) derivatives, e.g., α-chloroacrylic acid, and the anhydrides of these acids, if available, e.g., maleic anhydride, fumaric anhydride and citraconic anhydride.

Among the nitriles of such acids which can be employed are acrylonitrile, α-chloroacrylonitrile and methacrylonitrile, while among the amides of such acids which can be employed are unsubstituted amides such as acrylamide, methylacrylamide and other α-substituted acrylamides, and N-substituted amides obtained by reacting the amides of the aforementioned mono- and poly- carboxylic acids in known manner with an aldehyde such as formaldehyde or the like, e.g., N-methylolacrylamide, N-methylolmethacrylamide, alkylated N-methylolacrylamides and N-methylolmethacrylamides such as N-methoxymethylacrylamide, N-methoxymethylmethacrylamide, and the like.

Amino monomers which can be used include substituted and unsubstituted aminoalkyl acrylates, hydrochloride salts of the unsubstituted amino monomers and methacrylates such as aminomethylacrylate, β-aminoethylacrylate, aminomethylmethacrylate, β-aminoethylmethacrylate, dimethylaminoethylacrylate, β-dimethylaminoethylacrylate, dimethylaminoethylmethacrylate, β-dimethylaminomethylmethacrylate, and the like, while among the hydroxy-containing monomers which can be used are β-hydroxyethylacrylate, β-hydroxypropylacrylate, β-hydroxyethylmethacrylate and the like.

Typical "cross-linking monomers," i.e., ones which provide sites for subsequent cross-linking, such as those mentioned hereinabove, will generally be used in amounts ranging from about 0.1% to about 6% by weight, based on the total weight of monomers employed.

Furthermore, although aqueous copolymer emulsions wherein the copolymer contains one or more alkyl acrylates or methacrylates containing less than 10 carbon atoms in the alkyl moiety as the predominant monomer component (i.e., at least more than 40% by weight, based on the total weight of monomers employed, being present) are the preferred copolymer species prepared by the novel process of the present invention, these alkyl acrylates or methacrylates can be used in amounts ranging from about 5% to about 100% by weight, based on the total weight of monomers employed.

Thus, the novel process of the present invention should not be construed as being limited to the preparation of amounts of alkyl acrylates or methacrylates, or to the preparation of copolymers wherein only those monomers described above are copolymerized with these alkyl acrylates or methacrylates. Aside from the fact that homopolymers can be produced, these alkyl acrylates and methacrylates can, as previously indicated, be present in less than predominant amounts, and monomers not specifically mentioned hereinabove can also be employed. Thus, for example, styrene and substituted styrenes can be copolymerized with these alkyl acrylates and methacrylates, and copolymers can be prepared which contain one or more of these different comonomers, e.g., vinyl acetate, wherein the latter monomer or monomers is present in amounts greater than about 50% by weight on the above-stated basis.

In forming the monomer pre-emulsion, any anionic or non-ionic surfactant (which can also be termed an emulsifying agent, a dispersing agent or a wetting agent), or mixtures thereof, which can be employed in preparing conventional polymer emulsions can be used.

Among the non-ionic surfactants which can be used are polyethers, e.g., ethylene oxide and propylene oxide condensates in general, which include straight and branched-chain alkyl and alkylaryl polyethylene glycol and polypropylene glycol ethers and thioethers, and more particularly substances such as the "Igepals," which are members of a homologous series of alkylphenoxypoly(ethyleneoxy)ethanols, which series can be represented by the general formula

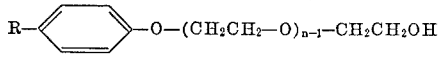

wherein R represents an alkyl radical and $n$ represents the number of mols of ethylene oxide employed, included among which are alkylphenoxypoly(ethyleneoxy) ethanols having the alkyl groups containing from about 7 to about 18 carbon atoms, inclusive, and having from about 4 to about 240 ethyleneoxy units, such as the heptylphenoxypoly(ethyleneoxy)ethanols, nonylphenoxypoly(ethyleneoxy) ethanols and dodecylphenoxypoly(ethyleneoxy)ethanols; the "Tweens," which are polyoxyalkylene derivatives of hexitol (including sorbitans, sorbides, mannitans and mannides) anhydride partial long chain fatty acid esters, such as the polyoxyalkylene derivatives of sorbitan monolaurate, sorbitan monopalmitate, sorbitan monostearate, sorbitan tristearate, sorbitan monooleate and sorbitan triolate; the "Pluronics," which are condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl dodecyl or tetradecyl mercaptan, or with alkylthiophenols wherein the alkyl group contains from 6 to 15 carbon atoms; ethylene oxides derivatives of long-chain carboxylic acids such as lauric, myristic, palmitic or oleic acid, or mixtures of acids, such as tall oil, and ethylene oxide derivatives of long-chain alcohols such as octyl, decyl, lauryl or cetyl alcohol.

Among the anionic surfactants which can be used are the higher molecular weight sulfates and sulfonates, e.g., sodium and potassium alkyl, aryl and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate, higher fatty alcohols, e.g., stearyl, lauryl, etc., which have been ethoxylated and sulfonated, dialkyl esters of alkali metal sulfosuccinic acid salts, such as sodium diamyl sulfosuccinic, sodium dihexyl sulfosuccinate and sodium dioctyl sulfosuccinate, and formaldehydenaphthalenesulfonic acid condensation products.

The monomer pre-emulsion, containing monomer(s), surfactant(s) and water, used in practicing the novel process of the present invention is preferably prepared by first admixing the surfactant or surfactant mixture with water and then adding the monomer or monomer mixture thereto, with stirring. The monomer or monomers should be added to the surfactant-water mixture at a rate such that the monomer pre-emulsion will continuously form while at the same time the buildup of unemulsified monomer on the surface of the surfactant-water mixture will be avoided. While the precise rate will vary from system to system, in general the monomer will be added more slowly at first and then more rapidly as the preparation progresses.

The term "stable pre-emulsion" as used herein is defined as the monomer emulsion which will maintain its emulsion properties at least during the addition of the pre-emulsion to the reaction medium, and preferably as long as 6 months or greater.

The total monomer content of the monomer pre-emulsion can range from about 75% to about 94% by weight, and preferably from about 75% to about 90% by weight, based on the total weight of the monomer pre-emulsion, when preparing the high solids polymer emulsions of the present invention.

The amount of surfactant employed in preparing the monomer pre-emulsion will generally be that amount conventionally employed when emulsifying monomers in an emulsion polymerization process, e.g., an amount ranging from about 1% to about 10% by weight, based on the total weight of the monomer pre-emulsion, and this can be the case whether a non-ionic or, anionic, surfactant or a mixture of the two surfactants is employed. However, it is preferred when using typical non-ionic surfactants, e.g., those of the above-described alkylphenoxypoly(ethyleneoxy) ethanols which contain from about 4 to about 240 ethyleneoxy units, or typical anionic surfactants, e.g., an ethoxylated higher fatty alcohol which has also been sulfonated, to employ them in amounts ranging from about 1.5% to about 6% by weight, on the above-stated basis.

One way of determining the amount of water desirable in preparing the monomer pre-emulsion is by measuring specific conductivity of the pre-emulsion. When plotted on a graph of specific conductivity vs. the amount of water present in the monomer pre-emulsion, at least approximately represents, and preferably actually represents, a break or inflection point in the curve which includes its plot and the plots of the specific conductivities of other monomer pre-emulsions identical in every respect except for having been made with a larger or smaller amount of water.

It has been discovered that monomer pre-emulsions made with such amounts of water will, when subsequently polymerized, provide high solids polymer emulsions having the minimum viscosity possible for an emulsion containing the particular amounts of polymer and surfactant present. In other words, there is a direct and in most cases near-absolute correspondence between the aforementioned break or inflection point on a curve which plots specific conductivity vs. the amount of water present in the monomer pre-emulsion and the minimum viscosity point on a curve which plots the amount of water present in the monomer pre-emulsion vs. the viscosity of the polymer emulsion made from the monomer pre-emulsion.

It has also been discovered that in all cases observed the particular amount of water employed in preparing monomer pre-emulsions for use in the novel process of the present invention will generally be about 1 mol for each mol of monomer present, or more particularly from about 0.9 mol to about 1.9 mols for each mol of monomer employed. This corresponds to approximately 6 to about 25 weight percent of water based on the total monomer present in the pre-emulsion. The preferred range of water ranges from about 10 to about 25 weight percent based on the total monomer present in the pre-emulsion. Monomer pre-emulsions made using these amounts of water rather than amounts corresponding exactly to those which give the aforementioned break or inflection point in the monomer pre-emulsion's specific conductivity curve, i.e., monomer pre-emulsions made without prior specific conductivity measurements, are generally close enough to the ideal to give satisfactorily high solids coupled with acceptable viscosities in the finished polymer emulsion.

Aside from the surfactant or surfactant mixture employed, the monomer pre-emulsions or the initial charge can also contain small amounts of one or more protective colloids, particularly when a reflux-type polymerization is carried out using vinyl acetate or the like as part of the monomer charge. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., ones containing no ether linkages, can also be used either alone or together with the aforementioned ether linkage-containing materials, and included among these are partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starch, glue, gelation, water soluble alginates such as sodium or potassium alginates, casein, agar, and natural and synthetic gums, such as gum arabic and gum tragacanth. All of these materials will be used in the amounts found in conventional emulsion polymerization procedures, i.e., in amounts usually ranging from about 0.1% to about 2% by weight of the polymer emulsion.

No particular elevated or lowered temperature or temperature range is required when preparing the monomer pre-emulsion, and in fact in most if not all cases the monomer pre-emulsion will be prepared at or near room temperature (about 25° C.).

The monomer or monomers in the pre-emulsion will be polymerized by means of a catalytic amount of a conventional amount of a conventional free radical polymerization catalyst or catalyst system (which can be referred to as an addition polymerization catalyst, a vinyl polymerization catalyst or a polymerization initiator), preferably, although not necessarily, one which is substantially water soluble. Among such catalysts are inorganic peroxides such as hydrogen peroxide, alkali metal (e.g., sodium, potassium or lithium) and ammonium persulfates, perphosphates and perborates, azonitriles, such as α,α-azobisisobutyronitrile, and redox systems, including such combinations as mixtures of hydrogen peroxide, t-butyl hydroperoxide, or the like and any of an iron salt, a titanous salt, zinc formaldehyde sulfoxylate or sodium formaldehyde sulfoxylate; an alkali metal or ammonium persulfate, borate or perchlorate together with an alkali metal bisulfite such as sodium metabisulfite; an alkali metal persulfate together with an arylphosphinic acid such as benzenephosphinic acid, and the like.

In accordance with the customary practice of the art, the amount of polymerization catalyst employed will be no more than that required to obtain substantially complete monomer conversion at lowest catalyst cost. Thus, for example, from about 0.3% to about 0.5% by weight of a perchlorate such as ammonium perchlorate together with an approximately equal amount of a bisulfite such as sodium metabisulfite, and preferably about 0.4% by weight of the bisulfite, each of these weight percentages being based on the total weight of the monomer pre-emulsion, can be employed.

While there is no criticality in the total amount of polymerization catalyst employed, other than that an amount sufficient to insure subsantially complete conversion should be employed, it is preferred, in order to also insure good conversion to stable polymer emulsions having optimum solids contents, that at least about 10% of the total amount of catalyst employed, and preferably from about 15% to about 20%, be present in the water to which the monomer pre-emulsion is added prior to the addition of the first amount of the monomer pre-emulsion.

It is also possible, when using redox catalyst systems, to dissolve the oxidant, e.g., ammonium persulfate, in the surfactant-water mixture prior to the preparation of the monomer pre-emulsion, and to then add the reductant, together with the oxidant-containing monomer pre-emulsion, to the water in which it will be polymerized.

As indicated hereinabove, the polymerization step of the novel process of the present invention is carried out by incrementally or continuously adding the pre-emulsion to water, and preferably simultaneously adding the remainder of the catalyst or catalyst system.

The amount of water to which the pre-emulsion is added will be determined by the solids content desired in the finished polymer emulsion. Thus, for example, when preparing a 70% solids polymer emulsion, the total amount of water present in the system (water from the monomer pre-emulsion, the catalyst, and even, in some cases, from the surfactant) will constitute about 30% by weight of the entire polymer emulsion, for a 60% solids polymer emulsion, 40% by weight of the entire emulsion will be water, etc.

The polymerization temperature will generally range from room temperature or lower to about 80° C. or above, and preferably from about 30° C. to about 60° C. and can be varied as the polymerization proceeds towards substantial completion. Subatmospheric, atmospheric or superatmospheric pressures can be employed during all or part of the polymerization, and depending on the monomers and catalyst employed the reaction can be carried out, if desired, under an inert atmosphere, e.g., under an inert nitrogen or carbon dioxide atmosphere. Thus, for example, polymerizations carried out at temperatures 10° C. or more below the boiling point of the lowest boiling monomer present will usually take place under an inert atmosphere.

The time during which the monomer or monomer pre-emulsion and the catalyst will be added to the water in which it will be polymerized, as well as the total reaction time, can vary to a considerable extent depending on such factors as the temperatures and pressures employed, the monomers and catalysts involved, the percent conversion and percent solids desired, and so forth. In general, however, the monomer or monomer pre-emulsion will be added to the water at a rate such that polymerization continuously takes place without unreacted monomer buildup. This can be accomplished, for example, by adding the monomer pre-emulsion to the water over a period of from about 2 to about 8 hours or more, and preferably from about 4 to about 6 hours, with the catalyst, usually in solution in water at concentrations ranging from about 3% to about 12% by weight, based on the total weight of the monomer pre-emulsion, i.e., if the monomer pre-emulsion is added over a 6 hour period, the catalyst solution will be introduced during approximately the same time. However, small amounts of the catalyst solution can be added subsequent to the introduction of the last of the monomer pre-emulsion to insure substantially complete polymerization, particularly where small amounts, e.g., up to about 0.5% by weight, based on the total weight of monomers present, of odorous monomers such as ethyl acrylate, butyl acrylate or the like remain unpolymerized.

Following the addition of the last of the monomer pre-emulsion and catalyst, the polymer emulsion can be worked up in any manner customarily employed in the art. Generally, it will be treated with base, e.g., aqueous sodium hydroxide or ammonium hydroxide, to neutralize any acidic material present, such as acidic monomers or catalyst residues. Generally, enough base will be added, with stirring, over a period of from about 30 to about 90 minutes, to reach and maintain a pH of from about 7.0 to about 10, and preferably from about 8 to about 9. The neutralized emulsions are usually allowed to cool to room temperature and then filtered, if necessary before being used.

Besides being useful in paint compositions, the novel polymer emulsions prepared by the novel method of the present invention can be used in producing elastomers, cross-linkable sealants and adhesives, in making foams, and in emulsion spinning processes.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

In making the viscosity measurements shown in these examples, a Model RVT Brookfield Viscometer was used, and the determinations were made on deaerated samples, which were allowed to stand for a few days until the initially high viscosity stabilized at a lower viscosity level. In all cases, however, viscosity measurements were made before settling, if any occurred.

EXAMPLE 1

The following components were used to prepare the emulsion using the procedure described below.

|  | Grams |
| --- | --- |
| Vinyl acetate | 227.5 |
| Acrylonitrile | 28.5 |
| Ethyl acrylate | 301.0 |
| N-methylolacrylamide (60% sol) | 12.5 |
| Methacrylic acid | 2.5 |
| Surfactants: | |
|   Igepal CO 897 (a reaction product of nonyl phenol and ethylene oxide wherein 40 moles ethylene oxide has been added per mole nonyl phenol producing a non-ionic) | 37.1 |
|   Igepal CO 530 (similar to product of Igepal CO 897 but having 6 moles ethylene oxide) | 37.1 |
| Sodium persulfate | 3.0 |
| Sodium metabisulfite | 3.0 |
| Total water | 390.0 |
| Total | 1018.1 |

Procedure (1) Weigh into a 1000 milliliters beaker: 70 grams water, the Igepal CO 897 and CO 530 and the N-methylolacrylamide. Maintain under mechanical agitation to insure good mixing.

(2) Weigh into a suitable container the ethyl acrylate, acrylonitrile, methacrylic acid, and vinyl acetate.

(3) Into the solution prepared in step 1 under adequate agitation, slowly add the monomer mix until pre-emulsification is complete as evidenced by a homogeneous mixture (agitation may have to be increased as the monomer mix is added to the solution). Pour the pre-emulsified monomers into a wide-mouth 1000 cc. dropping funnel and hold for delayed addition.

(4) Weigh 3–1 gram aliquots of sodium persulfate and use as following:

1 gram for initial add—dry.
1 gram in 50 cc. $H_2O$ for delayed addition.
1 gram in 10 cc. $H_2O$ for addition during final hold.

(5) Weigh 3–1 gram aliquots of sodium metabisulfite and use same procedure as in step 4.

(6) Place 200 grams of $H_2O$ in flask along with 1 gram each of sodium persulfate and sodium metabisulfite and heat to 65° C. by means of an external water bath. (Use moderate stirring).

(7) When temperature of water in flask reaches 65° C., start additions of pre-emulsified monomer, catalyst and activator feeds.

(8) Feed monomer feed over a 4 hour period.

(9) Feed catalyst and activator feed over a 4 hour and 10 minute period.

(10) Maintain reaction temperature at 65° C.

(11) At the completion of catalyst and activator feeds, start the additions of catalyst and activator solutions set aside for final hold over a period of 10 minutes. A slight exotherm may be noted.

(12) At the completion of the excess catalyst and activator feeds, hold the reaction at 65° C. for 1 hour.

(13) Cool to room temperature.

The total solids content was 60 weight percent. Viscosity, centipoises 700–800.

After the emulsion has cooled, it is adjusted to a pH of 6.2–6.4 with 15 percent ammonium hydroxide and placed under agitation. Sodium polyacrylates having a viscosity of 40–50 centipoises is then added dropwise to the emulsion under agitation until a viscosity of 20,000–30,000 centipoises is obtained. The emulsion was stored for 45 days and upon examination after this period was evaluated for stability as indicated in the comparative list of Table I below.

EXAMPLE II

This example represents the compositions of this invention. The same composition and procedure was used as in Example I except that 28.0 grams of ethyl acrylate was held out from the initial polymerization and added over a period of 15 minutes before step 11 of Example I. The emulsion was tested as in Example I and evaluated as shown in Table I below.

EXAMPLE III

The composition and procedure of Example I are identical with the following exceptions: The following material was held out from the original pre-emulsion:

|  | Grams |
| --- | --- |
| Ethyl acrylate | 15.0 |
| N-methylolacrylamide | 0.6 |
| Acrylonitrile | 1.4 |
| Igepal CO 897 | 1.0 |
| Igepal CO 530 | 0.5 |
| Water | 2.5 |

These materials were mixed to form a pre-emulsion and added over a period of 15 minutes to the emulsion after the vinyl acetate copolymer was formed after step 10 of Example I. The emulsion was tested as in Example I and evaluated as shown in Table I below.

EXAMPLE IV

Example III was duplicated except for the different amounts of material in the material held out from the original pre-emulsion. These amounts are as follows:

|  | Grams |
| --- | --- |
| Ethyl acrylate | 85.5 |
| N-methylolacrylamide | 3.5 |
| Acrylonitrile | 8.1 |
| Igepal CO 897 | 6.0 |
| Igepal CO 530 | 3.0 |
| Water | 12.0 |

The emulsion was tested as in Example I and evaluated as shown in Table I below.

EXAMPLE V

Example IV was duplicated except for the different amounts of material in the material held out from the oriignal pre-emulsion. These amounts are as follows:

|  | Grams |
| --- | --- |
| Ethyl acrylate | 57.25 |
| N-methylolacrylamide | 2.4 |
| Acrylonitrile | 5.5 |
| Igepal CO 897 | 4.0 |
| Igepal CO 530 | 2.0 |
| Water | 8.0 |

The emulsion was tested as in Example I and evaluated as shown in Table I below.

EXAMPLE VI

The same composition and procedure was used as in Example I except that a portion of the monomer is held out for addition after step 10 as follows:

|  | Grams |
|---|---|
| Ethyl acrylate | [1] 15.0 |
| Acrynonitrile | [1] 1.4 |
| N-methylolacrylamide | [1] 0.6 |
| Water | [1] 2.0 |

[1] Blended together and added to polymerization.

The above material was added as separate streams (not as pre-emulsion) over a period of 15 minutes. The emulsion was tested as in Example I and evaluated as shown in Table I below.

TABLE I

| Examples | Monomer percent overpolymerization | Type of addition for overpolymerization | 45 days evaluation sodium acrylate |
|---|---|---|---|
| I | None | None | 14 days—completely jelled. |
| II | 5 | Ethylacrylate monomer | No viscosity change; slight yellow color. |
| III | 2.7 | Monomer pre-emulsion | Do. |
| IV | 15 | do | No viscosity change; very slight yellow color. |
| V | 10 | do | Slight viscosity increase; very slight yellow color. |
| VI | 2.7 | Separate stream addition | No viscosity change; very slight yellow color. |

Table I indicates that vinyl acetate copolymers without overpolymerization completely jells after 14 days while all of the other compositions (Examples II through VI) falling within the scope of the invention provide stable emulsions after 45 days of aging in the presence of sodium polyacrylate with only a slight color change occurring.

It will be obvious to those skilled in the art that other changes and variations can be made in carrying out the present invention without departing from the spirit and scope thereof as defined in the appended claims.

What is claimed is:

1. An aqueous emulsion of an interpolymer produced by polymerizing a monomer charge comprising:
   (a) between about 5 percent and about 50 percent by weight based on the total weight of the monomer charge of vinyl acetate;
   (b) between about 0.1 percent and about 6 percent by weight based on the total weight of the monomer charge of acrylonitrile;
   (c) between about 0.1 percent and about 6 percent by weight based on the total weight of the monomer charge of an alpha, beta-unsaturated amide having the following formula:

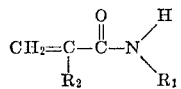

wherein $R_1$ is a methylol substituent or an alkyl substituent of between 1 and about 6 carbon atoms, and $R_2$ is a hydrogen substituent or a methyl substituent;
   (d) between about 40 percent and about 90 percent by weight based on the total weight of the monomer charge of an alkyl ester of an alpha, beta-unsaturated carboxylic acid having the following formula:

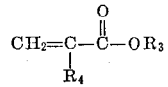

wherein $R_3$ is an alkyl substituent of between 1 and about 8 carbon atoms, and $R_4$ is a hydrogen substituent or a methyl substituent; and
   (e) between about 0 percent and about 6 percent by weight based on the total weight of the monomer charge of methacrylic acid,
   said interpolymer being further characterized in that a composition selected from the group consisting of components (b), (c) and (d) or mixtures thereof, is polymerized over the base polymer derived from the interpolymerization of components (a), (b), (c), (d) and (e) set forth above, and the total amount of said overpolymerized portion ranges from about 0.5 percent to about 25 percent by weight based on the total weight of the monomer charge.

2. An aqueous emulsion according to claim 1 wherein component (c) is N-methylolacrylamide and component (d) is ethyl acrylate.

3. An aqueous emulsion according to claim 2 wherein the portion of the monomer charge polymerized over the base polymer consists essentially of ethyl acrylate.

4. An aqueous emulsion according to claim 2 wherein the portion of the monomer charge polymerized over the base polymer comprises ethyl acrylate, N-methylolacrylamide, and acrylonitrile.

5. A process for producing an aqueous polymer emulsion comprising:
   (1) contacting a mixture of water, a free radical polymerization catalyst, and a non-ionic surfactant or anionic surfactant with a monomer charge comprising:
      (a) between about 5 percent and about 50 percent by weight based on the total weight of the monomer charge of vinyl acetate;
      (b) between about 0.1 percent and about 6 percent by weight based on the total weight of the monomer charge of acrylonitrile;
      (c) between about 0.1 percent and about 6 percent by weight based on the total weight of the monomer charge of an alpha, beta-unsaturated amide having the following formula:

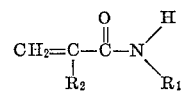

wherein $R_1$ is a methylol substituent or an alkyl substituent of between 1 and about 6 carbon atoms and $R_2$ is a hydrogen substituent or a methyl substituent;
      (d) between about 40 percent and about 90 percent by weight based on the total weight of the monomer charge of an alkyl ester of an alpha, beta-unsaturated carboxylic acid having the following formula:

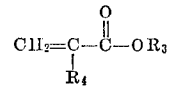

wherein $R_3$ represents an alkyl substituent of between 1 and about 8 carbon atoms and $R_4$ represents a hydrogen substituent or a methyl substituent; and
      (e) between about 0 percent and about 6 percent by weight based on the total weight of the monomer charge of methacrylic acid,
      said contacting being further characterized in that a composition selected from the group consisting of components (b), (c) and (d) or mixtures thereof, is held in reserve, the total amount of said reserve portion ranging from about 0.5 percent to about 25 percent by weight based on the total weight of the monomer charge;
   (2) initiating the interpolymerization of the monomer charge;
   (3) continuing the interpolymerization initiated in step (2) until a base polymer is formed;
   (4) contacting the base polymer formed in step (3) with the reserve portion of the monomer charge;

(5) initiating the polymerization of the reserve portion of the monomer charge over the base polymer; and (6) continuing the overpolymerization initiated in step (5) until an interpolymer is formed, the vinyl acetate constituent whereof is stable to hydrolysis.

6. A process for producing an aqueous polymer emulsion according to claim 5 wherein: components (c) and (d) of the monomer charge are respectively N-methylolacrylamide and ethyl acrylate.

7. A process for producing an aqueous polymer emulsion according to claim 6 wherein the portion of the monomer charge held in reserve in step (1) and polymerized over the base polymer in steps (5) and (6) consists essentially of ethyl acrylate.

8. A process for producing an aqueous polymer emulsion according to claim 6 wherein the portion of the monomer charge held in reserve in step (1) and polymerized over the base polymer in steps (5) and (6) comprises ethyl acrylate, N-methylolacrylamide, and acrylonitrile.

References Cited

UNITED STATES PATENTS

| | | | |
|---|---|---|---|
| 2,819,237 | 1/1958 | Daniel | 260—29.6 TA X |
| 3,008,920 | 11/1961 | Urchick | 260—885 X |
| 3,083,172 | 3/1963 | Scott et al. | 260—885 X |
| 3,442,844 | 5/1969 | Bouchard | 260—29.6 T |

JULIUS FROME, Primary Examiner

J. B. LOWE, Assistant Examiner

U.S. Cl. X.R.

260—29.6 WB, 29.6 TA